(12) United States Patent
Hung et al.

(10) Patent No.: US 8,852,721 B2
(45) Date of Patent: Oct. 7, 2014

(54) METHOD FOR CUTTING TEMPERED GLASS AND PREPARATORY TEMPERED GLASS STRUCTURE

(75) Inventors: Jeng-Jye Hung, Tai Chung County (TW); Yi-Te Lee, Kaohsiung (TW); Hen-Ta Kang, Taichung (TW); Chih-Yuan Wang, Tai Chung County (TW)

(73) Assignees: Dongguan Masstop Liquid Crystal Display Co., Ltd., Dongguan (CN); Wintek Corporation, Taichung (TW)

( * ) Notice: Subject to any disclaimer, the term of this patent is extended or adjusted under 35 U.S.C. 154(b) by 555 days.

(21) Appl. No.: 13/013,415

(22) Filed: Jan. 25, 2011

(65) Prior Publication Data

US 2011/0183116 A1 Jul. 28, 2011

(30) Foreign Application Priority Data

Jan. 27, 2010 (TW) ............... 99102208 A
Sep. 28, 2010 (TW) ............... 99132711 A

(51) Int. Cl.
*B32B 3/30* (2006.01)
*C03C 21/00* (2006.01)
*B24B 7/24* (2006.01)
*C03B 33/023* (2006.01)

(52) U.S. Cl.
CPC ............. *C03C 21/002* (2013.01); *B32B 3/30* (2013.01); *B24B 7/241* (2013.01); *C03C 21/00* (2013.01); *C03B 33/023* (2013.01)
USPC ....................................... 428/167

(58) Field of Classification Search
CPC .......... B32B 3/30; B32B 17/00; B24B 7/241; C03B 33/023; C03C 21/022; C03C 21/00
USPC ..................................... 428/156, 167
See application file for complete search history.

(56) References Cited

U.S. PATENT DOCUMENTS

| | | | |
|---|---|---|---|
| 4,702,042 A * | 10/1987 | Herrington et al. | 451/40 |
| 7,141,443 B2 * | 11/2006 | Nagai et al. | 438/33 |
| 7,618,895 B2 | 11/2009 | Miyahara et al. | |
| 2002/0006765 A1 * | 1/2002 | Michel et al. | 451/28 |
| 2004/0141145 A1 * | 7/2004 | Tatemura et al. | 349/200 |
| 2005/0221044 A1 * | 10/2005 | Gaume et al. | 428/43 |
| 2005/0258135 A1 | 11/2005 | Ishikawa et al. | |
| 2007/0151962 A1 * | 7/2007 | Doll et al. | 219/121.72 |
| 2010/0119846 A1 * | 5/2010 | Sawada | 428/426 |
| 2010/0182274 A1 | 7/2010 | Kang et al. | |

FOREIGN PATENT DOCUMENTS

| | | |
|---|---|---|
| CN | 1577726 A | 2/2005 |
| CN | 1714055 A | 12/2005 |
| CN | 1930097 A | 3/2007 |
| TW | 200902467 A | 1/2009 |

* cited by examiner

*Primary Examiner* — Donald J Loney
(74) *Attorney, Agent, or Firm* — Muncy, Geissler, Olds & Lowe, P.C.

(57) ABSTRACT

A preparatory tempered glass structure for a cutting treatment includes a glass substrate and at least one trench. The glass substrate is given a strengthening treatment to form, from a surface to the inside of the glass substrate, at least one compression stress layer and a tensile stress layer corresponding to the compression stress layer. The trench is formed in the compression stress layer of the glass substrate and overlaps a predetermined cutting path for the cutting treatment.

4 Claims, 5 Drawing Sheets

METHOD FOR CUTTING TEMPERED GLASS AND PREPARATORY TEMPERED GLASS STRUCTURE

BACKGROUND OF THE INVENTION a. Field of the Invention

The invention relates to a method for cutting a tempered glass and a preparatory tempered glass structure for a cutting treatment.

b. Description of the Related Art

Generally, conventional methods for strengthening glass mainly include a heat strengthening treatment or a chemically strengthening treatment. For example, in a typical chemically strengthening treatment such as an ion exchange glass strengthening treatment, a glass substrate is submersed in a bath containing a potassium salt. This causes sodium ions on the glass surface to be replaced by potassium ions from the bath solution. Under the circumstance, a thin compression stress layer is formed on a skin layer of the glass substrate. As shown in FIG. 1A and FIG. 1B, a tensile stress TS is formed correspondingly inside a tempered glass 100 to compensate the compression stress of a compression stress layer DOL. Compared FIG. 1A with FIG. 1B, when the compression stress layer DOL becomes thicker (layer thickness in FIG. 1B is larger then that in FIG. 1A), the strength of the tempered glass 100 becomes greater and the tensile stress TS inside the tempered glass 100 also becomes greater. Hence, as the tensile stress TS is increased to a considerable extent, the tempered glass 100 being cut is liable to irregularly split due to the tensile stress TS. This may result in extremely low production yield.

BRIEF SUMMARY OF THE INVENTION

The invention provides a tempered glass cutting method and a preparatory tempered glass structure to improve the production yield.

According to an embodiment of the invention, a method for cutting a tempered glass including the steps of strengthening a glass substrate to form, from a surface to the inside of the glass substrate, at least one compression stress layer and a tensile stress layer corresponding to the compression stress layer; removing a part of the glass substrate, wherein the compression stress layer is formed in the part of the glass substrate, and a predetermined cutting path passes through the part of the glass substrate; and cutting the glass substrate along the predetermined cutting path.

According to another embodiment of the invention, a method for cutting a tempered glass including the steps of: strengthening a glass substrate by an ion exchange glass strengthening treatment to form, from a surface to the inside of the glass substrate, at least one compression stress layer and a tensile stress layer corresponding to the compression stress layer; forming at least one trench on the glass substrate at a position overlapping the compression stress layer and a predetermined cutting path; and cutting the glass substrate along the trench.

According to another embodiment of the invention, a preparatory tempered glass structure for a cutting treatment includes a glass substrate and at least one trench. The glass substrate is given a strengthening treatment to form, from a surface to the inside of the glass substrate, at least one compression stress layer and a tensile stress layer corresponding to the compression stress layer. The trench is formed in the compression stress layer of the glass substrate and overlaps a predetermined cutting path for the cutting treatment.

According to the above embodiments, a part of the compression stress layer through which a predetermined cutting path passes is removed to reduce corresponding internal tensile stress. Therefore, when one cuts the tempered glass, a tempered glass block with a demanded size and a smooth facet is obtained to improve the production yield. Further, since the remainder part of the compression stress layer outside the predetermined cutting path is not removed, the effect of strengthening the glass substrate is still maintained.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figures 1A, 1B:
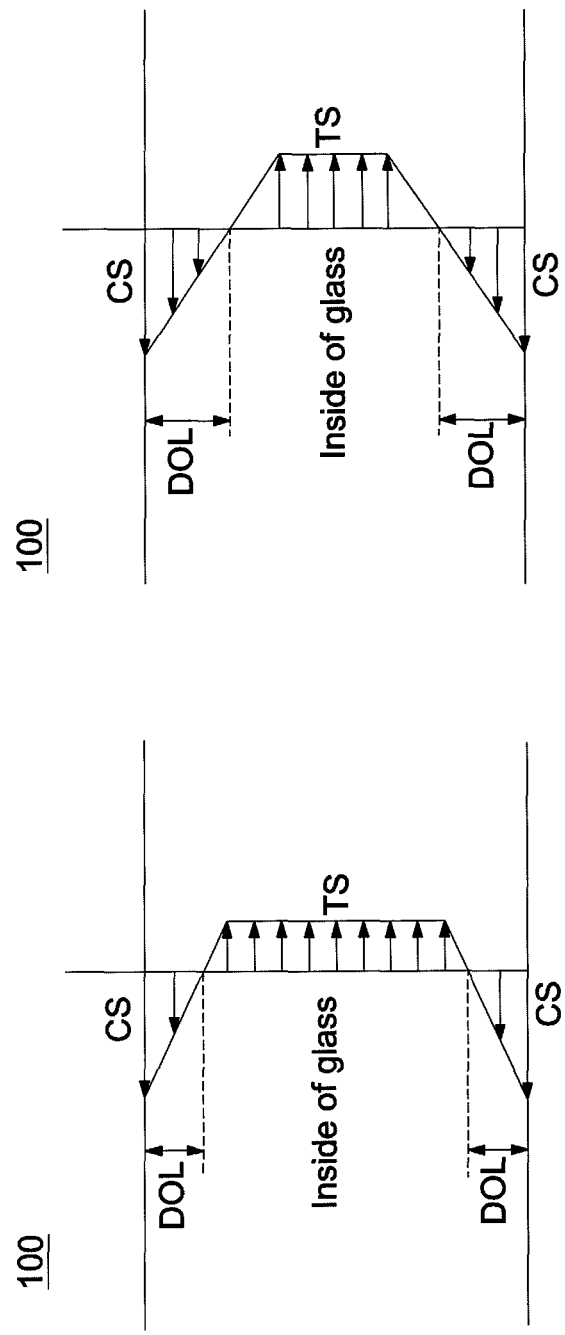
FIG. 1A and FIG. 1B show schematic diagrams of a conventional chemically strengthened glass.
Figure 2:
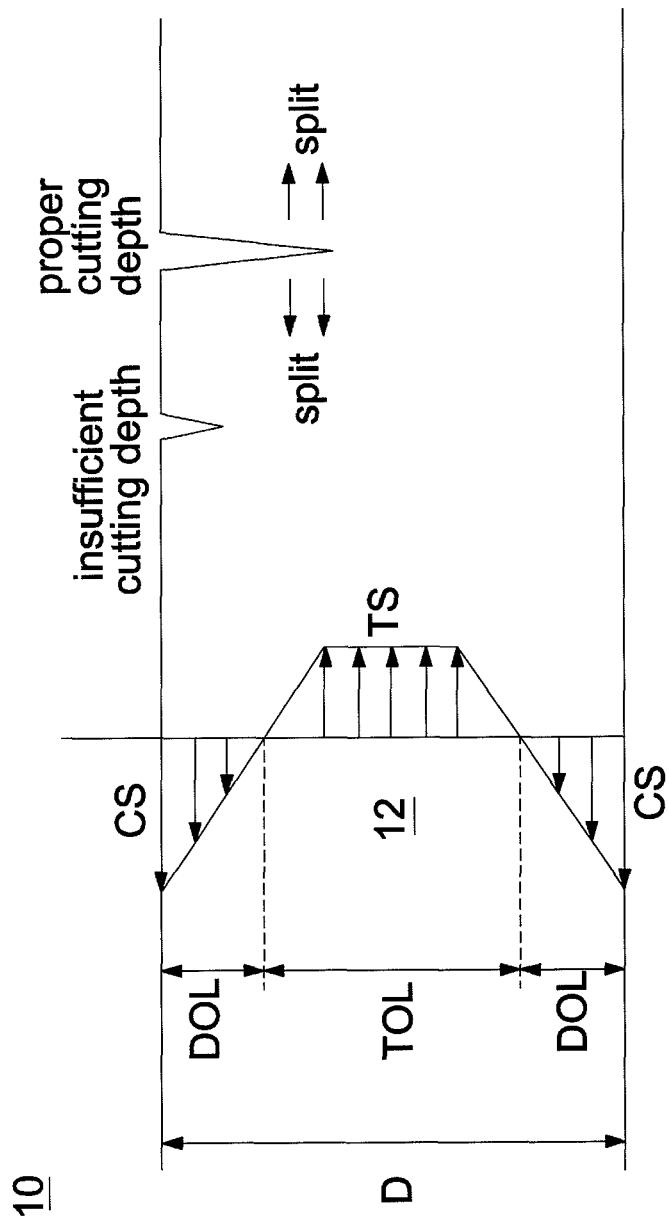
FIG. 2 to FIG. 4 show schematic diagrams illustrating a tempered glass cutting method according to an embodiment of the invention.

Referring to FIG. 2, a tempered glass 10 according to an embodiment of the invention is formed by a glass substrate 12 given a strengthening treatment. The glass strengthening treatment, for example, may be an ion exchange glass strengthening treatment. In a typical ion exchange glass strengthening treatment, the glass substrate 12 is submersed in a bath containing a potassium salt. This causes sodium ions on the skin layer of the glass substrate 12 to be replaced by potassium ions from the bath solution. Under the circumstance, a compression stress layer DOL is formed on the skin layer of the glass substrate 12, and a tensile stress TS is formed inside the glass substrate 12 to compensate the compression stress of the compression stress layer DOL. In other words, a compression stress layer DOL and a tensile stress layer TOL are correspondingly formed in succession from a surface to the inside of the glass substrate 12. When the compression stress layer DOL becomes thicker, the strength and the internal tensile stress TS of the tempered glass 10 become greater. The stress and thickness stratify the following equation: $TS=CS*[Dc/(D-2*Dc)]$, where TS is the tensile stress, CS is the compression stress, Dc is the thickness of the compression stress layer, and D is the overall thickness of the tempered glass 10.

When the tempered glass 10 is cut, a proper cutting depth must exceed the thickness of the compression stress layer DOL; in other words, a crack as a result of cutting may pierce the tensile stress layer TOL inside the glass substrate 12. As the tensile stress TS is increased to a considerable extent, the tip of a fracture irregularly splits due to the tensile stress TS, as shown in FIG. 2, and thus a demanded size of a glass block cut from the tempered glass 10 fails to be obtained. However, such problem is solved as long as the tensile stress TS inside the glass substrate 12 is reduced. According to an embodiment shown in FIG. 3 and FIG. 4, since the tensile stress TS is induced to compensate the compression stress of the compression stress layer DOL, a part of the compression stress layer DOL through which a predetermined cutting path passes is removed by etching or polishing the glass substrate 12 to reduce corresponding internal tensile stress TS. Therefore, when one cuts the tempered glass 10, a tempered glass block with a demanded size and a smooth facet is obtained to improve the production yield. Further, since the remainder part of the compression stress layer DOL outside the predetermined cutting path is not removed, the effect of strengthening the glass substrate 12 is still maintained. Certainly, the method for removing a part of the glass substrate 12 to relief the tensile stress TS includes, but is not limited to, etching and polishing processes.

Figure 3:
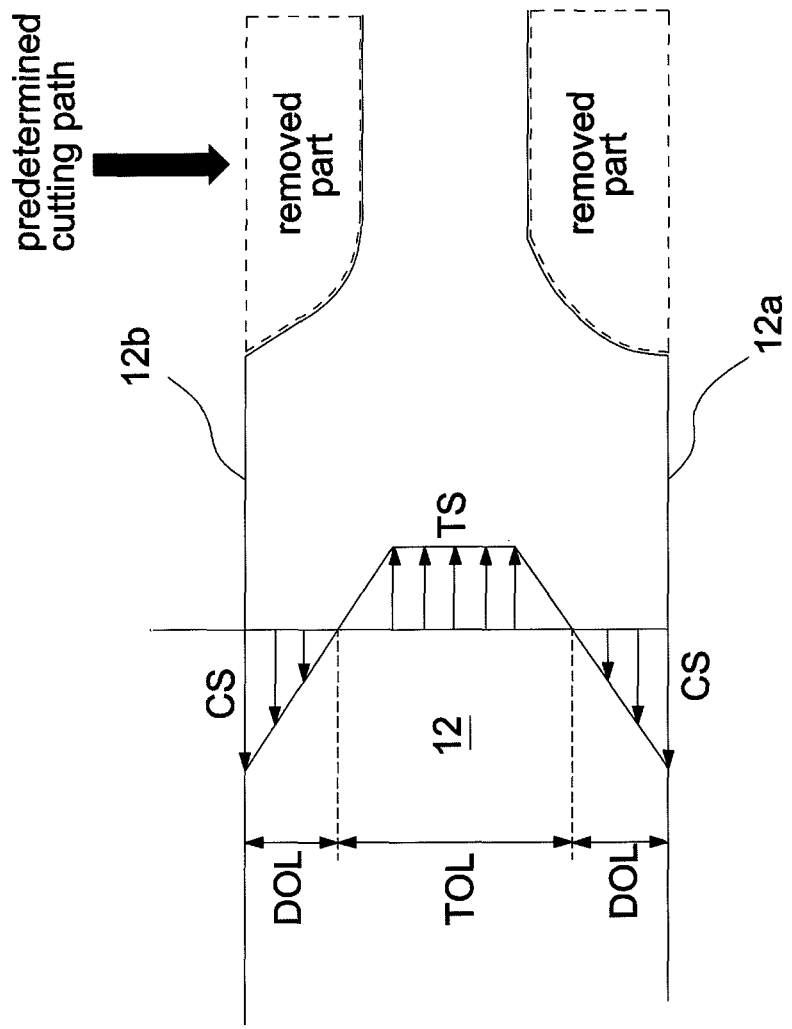
Figure 4:
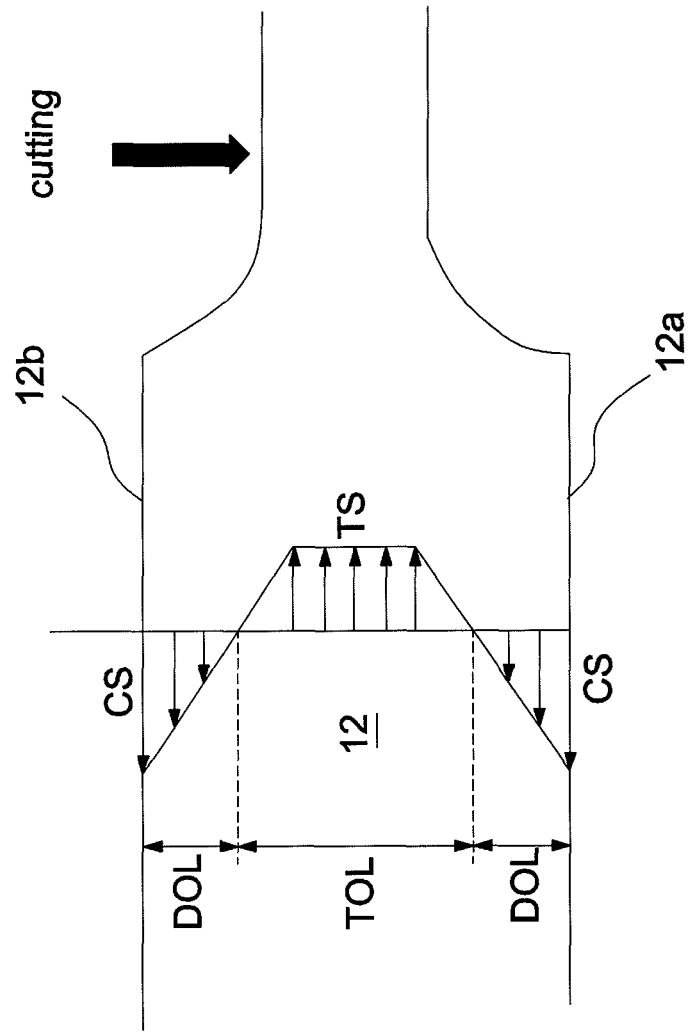

Besides, the glass strengthening treatment may be given on any region of the glass substrate 12. For example, as shown in FIG. 3, since a bottom surface 12a and a top surface 12b are both given a strengthening treatment, a part of the compression stress layer DOL on the bottom surface 12a and the top surface 12b overlapping a predetermined cutting path is removed. Certainly, the area and depth of a part of the compression stress layer DOL to be removed are not limited, as long as the effect of relieving the tensile strength and preventing irregularly cracks is achieved. Besides, the material of the glass substrate 12 includes, but is not limited to, sodium calcium silicate glass and aluminosilicate glass. Further, the strengthening treatment is not limited to the ion exchange glass strengthening treatment exemplified above, and any strengthening treatment capable of forming compression stress and tensile stress in the glass substrate 12 is suitable for the above embodiments.

Figure 5B:
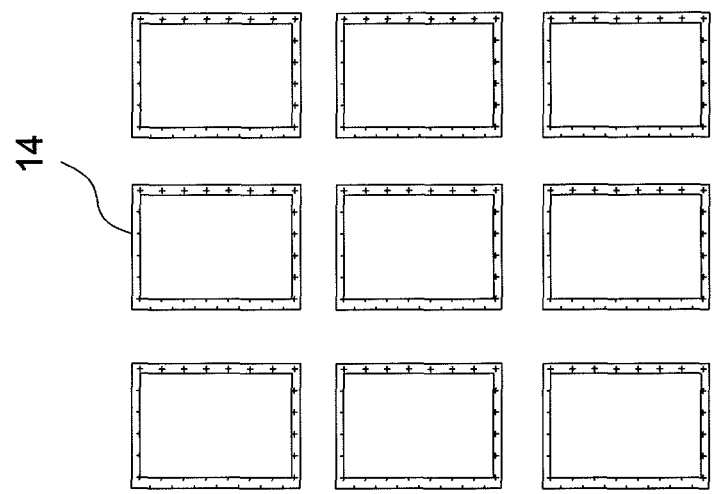
FIG. 5B shows a schematic diagram of multiple glass blocks cut from the preparatory tempered glass structure.
Figure 5A:
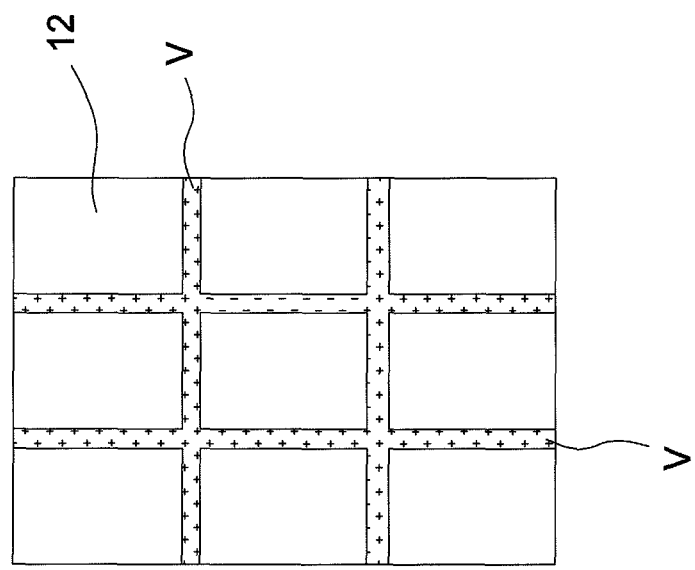
FIG. 5A shows a schematic diagram of a preparatory tempered glass structure for a cutting treatment.

FIG. 5A shows a schematic diagram of a preparatory tempered glass structure for a cutting treatment, and FIG. 5B shows a schematic diagram of multiple glass blocks cut from the preparatory tempered glass structure. Referring to FIG. 5A, after a glass substrate 12 is given a glass strengthening treatment such as an ion exchange glass strengthening treatment, a compression stress layer and a tensile stress layer are correspondingly formed in succession from a surface to the inside of the glass substrate 12. Further, at least one trench V (such as multiple trenches shown in FIG. 5A) is formed on a bottom surface 12a and a top surface 12b of the glass substrate 12 by etching or polishing processes. The trench V overlaps a predetermined cutting path, and the depth of the trench V is preferably set as slightly larger than the thickness of the compression stress layer. As shown in FIG. 5B, when the preparatory tempered glass structure is cut along the trench V, multiple tempered glass blocks 14 with a demanded size and a smooth facet are obtained.

Further, the use of a tempered glass according to the above embodiments is not limited. For example, the tempered glass may serve as a glass substrate or a cover glass of a touch panel. Alternatively, the tempered glass may serve as a glass substrate of a liquid crystal display, an organic electroluminescence display, an electrowetting display or a bi-stable display.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A preparatory tempered glass structure for a cutting treatment, comprising:
   a glass substrate given a strengthening treatment to form, from a surface to the inside of the glass substrate, at least one compression stress layer and a tensile stress layer corresponding to the compression stress layer, wherein the glass substrate has a bottom surface and a top surface opposite the bottom surface;

a first trench formed on the top surface and in the compression stress layer of the glass substrate without splitting the glass substrate to remove a part of the compression stress layer and correspondingly reduce a tensile stress along the first trench;

a second trench formed on the bottom surface and in the compression stress layer of the glass substrate without splitting the glass substrate to remove a part of the compression stress layer and correspondingly reduce a tensile stress along the second trench; and a scribe line formed in the first trench or the second trench to initiate the cutting treatment and define a cutting path for the cutting treatment.

2. The preparatory tempered glass structure as claimed in claim 1, wherein the depth of the trench is substantially larger than the thickness of the compression stress layer.

3. The preparatory tempered glass structure as claimed in claim 1, wherein the glass substrate is given an ion exchange glass strengthening treatment.

4. The preparatory tempered glass structure as claimed in claim 1, wherein the trench is formed by etching or polishing.

* * * * *